United States Patent [19]

Ivanov et al.

[11] 4,154,334
[45] May 15, 1979

[54] ARRANGEMENT FOR TRANSPORTATION OF CONTAINERS WITHIN CARGO COMPARTMENTS OF AIRCRAFT

[76] Inventors: Jury N. Ivanov, Oruzheiny pereulok, 5-9, kv. 60; Konstantin V. Artemov, Nizhegorodskaya ulitsa, 21, kv. 29; Leonid I. Suris, Smolnaya ulitsa, 31, kv. 85., all of Moscow, U.S.S.R.

[21] Appl. No.: 819,946

[22] Filed: Jul. 28, 1977

[51] Int. Cl.² .............................................. B65G 25/08
[52] U.S. Cl. .................................... 198/746; 198/748; 244/137 R
[58] Field of Search .................... 214/83.14, 84, 516; 244/118 R, 137 R; 104/162; 198/738, 746, 747, 748

[56] References Cited

U.S. PATENT DOCUMENTS

| 3,302,772 | 2/1967 | Alsop | 198/746 |
| 3,568,825 | 3/1971 | Munger | 198/746 |

*Primary Examiner*—Robert G. Sheridan
*Attorney, Agent, or Firm*—Robert E. Burns; Emmanuel J. Lobato; Bruce L. Adams

[57] ABSTRACT

An arrangement for transportation of containers within cargo compartment of aircraft has, according to the invention, guide members extending along the cargo compartment and a closed flexible traction member having a drive interposed between the guide members. Accommodated in the guide members is a carriage connected to the flexible traction member. A spring-loaded lever is articulated with one end thereof to the carriage at right angle to the carriage plane, the lever is rotatable both about its axis and in a vertical plane extending along the axis of the carriage.

4 Claims, 6 Drawing Figures

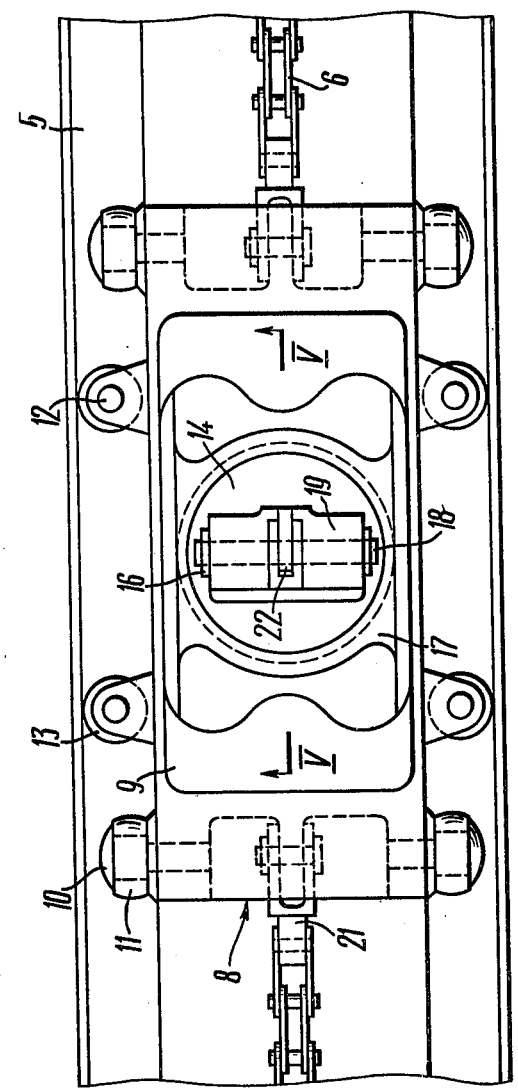

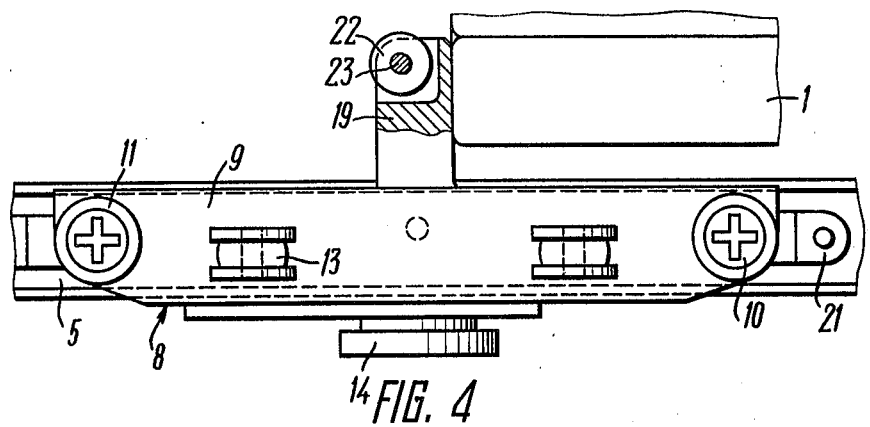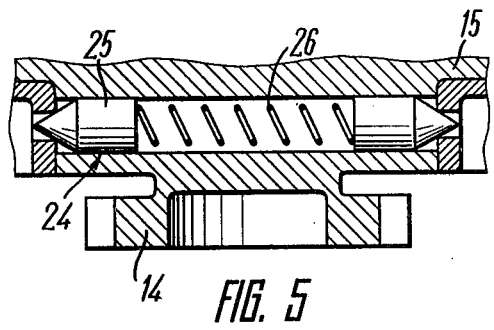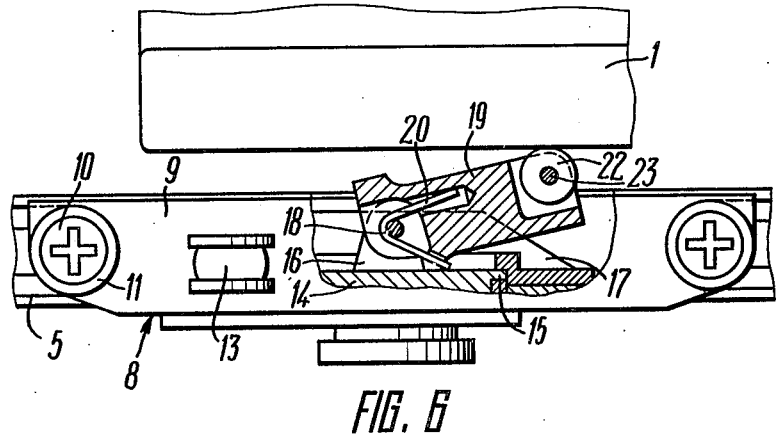

1

ARRANGEMENT FOR TRANSPORTATION OF CONTAINERS WITHIN CARGO COMPARTMENTS OF AIRCRAFT

BACKGROUND OF THE INVENTION

The present invention relates to the field of cargo transportation in aircraft, and more particularly to arrangements for transportation of containers within cargo compartments of aircraft.

The present invention may be most advantageously used for cargo transportation in cargo compartments of airplanes using containers.

The invention may be also used in ground handling equipment for carrying containers.

Several types of transport apparatus are known for transportation of luggage or containers within cargo compartments of aircraft. One type of transport apparatus makes use of overhead jib cranes travelling on a monorail and remotely controlled. The cables in this type of apparatus form depending loops that can result in pinching and damage to the cables by the containers being transported. Another type of known transport apparatus makes use of tracks overhead of the cargo compartment on which a trolley travels. The trolley is provided with L-shaped grippers activated to grip and lift containers and lower them. The apparatus of this type use a considerable amount of the cargo compartment and are bulky.

It is also known to use rubber-lined rollers on the floor of a cargo compartment. The rollers are driven by several drives and accordingly transport of this type are heavy and costly.

Cargo transport apparatus for aircraft also make use of driven chain conveyors on which are located spaced upstanding plates between which luggage or containers are transported. The conveyors are provided with guides between which are mounted the upstanding plates. Apparatus of this type are quite inadequate for aircraft use.

SUMMARY OF THE INVENTION

It is an object of the invention to eliminate the above-mentioned disadvantages of prior art systems for transportation of containers in cargo compartments of aircraft.

It is also an object of the invention to simplify operation and make it more convenient.

Still another object of the invention is to reduce the time required for handling operations in the containerized cargo transports.

Another object of the invention is to lower the input of a drive motor so as to reduce weight.

Broadly speaking, it is an object of the invention to provide an arrangement for transportation of containers within cargo compartments of aircraft which provides for consecutive loading and unloading of containers into and from cargo compartments while being lightweight and having a low-input motor.

The above objects are accomplished by an arrangement for transportation of containers within cargo compartments of aircraft comprising an endless traction member having a drive interposed between guide members extending along the cargo compartment, in the floor thereof. According to the invention, there is provided a carriage mounted within the guide members and connected to the flexible traction member, and a spring-loaded lever is articulated with one end thereof to the carriage at right angle to the carriage plane. The lever is rotatable both about its axis and in a vertical plane along the carriage axis.

The provision of a single movable carriage makes the arrangement more convenient and simple in operation, enables the installation of a low-input electric motor since the carriage is only used for transportation of one container at a time, rather than of all containers accommodated within the cargo compartment. The movable carriage ensures transportation of containers with the unloading hatch located in any convenient place within the cargo compartment.

In the arrangement for transportation of containers within cargo compartments of aircraft, the lever is preferably mounted by means of a horizontal pivot axle which is supported by a base rotatable relative to the carriage body.

The provision of the pivot axle of the lever ensures reliable operation of the carriage upon reversing the direction of transportation of containers.

The arrangement for transportation of containers within cargo compartments of aircraft is preferably provided with a locking member to hold the lever in the operative positions against rotation about its axis.

The locking members are made in the form of spring-loaded stops accommodated in the body of the rotatable base so that their ends protrude over the side surface of the base.

The locking member is used to hold the lever in the operative positions against rotation about its axis.

At is advisable that in the arrangement for transportation of containers within cargo compartments of aircraft, a roller be fixed to the distal end of the lever, the roller axis extending at right angle to the carriage axis.

The provision of the roller protects the container bottom against damages which might otherwise occur when the carriage passes beneath the container.

BRIEF DESCRIPTION OF THE DRAWINGS

The invention will now be described with reference to a special embodiment thereof illustrated in the accompanying drawings, in which:

FIG. 3 is a view taken along arrow B in FIG. 2;

FIG. 4 is a sectional view taken along the section line IV—IV in FIG. 1 (turned at 90°);

FIG. 5 is a sectional view taken along the section line V—V in FIG. 3;

FIG. 6 shows the position of the lever during the passage of the carriage beneath the container bottom.

DESCRIPTION OF THE PREFERRED EMBODIMENTS

Figure 1:
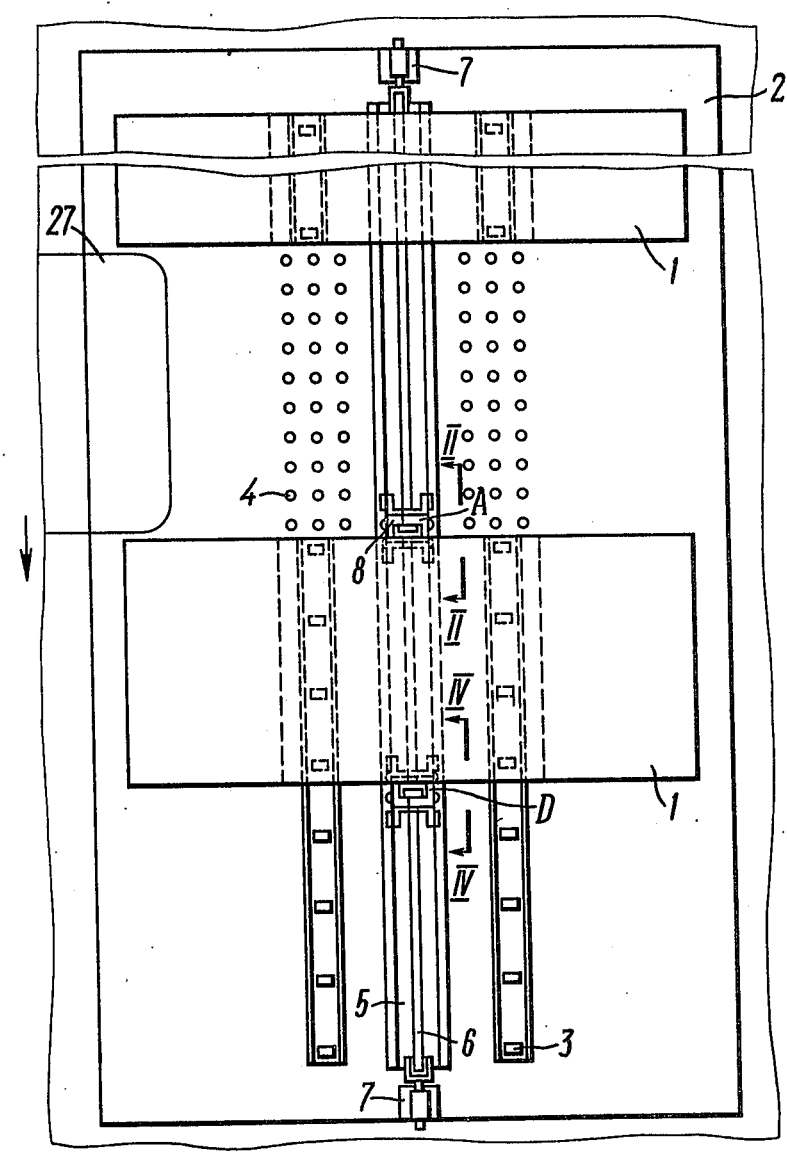
FIG. 1 is a general plan view of a cargo compartment having the arrangement for transportation of containers within cargo compartment of aircraft.

An arrangement for transportation of containers 1 (FIG. 1) is incorporated in the floor 2 of a cargo compartment of an aircraft where the containers 1 are usually mounted on roller tracks 3 and ball tracks 4.

The arrangement for transportation of containers 1 comprises two guide members 5 extending along the cargo compartment symmetrically about its axis in the floor 2.

An endless flexible traction member 6 extends within the guide members 5. The traction member 6 can be made in the form of e.g. a plate chain conveyor with a drive (not shown) and with mechanisms 7 for chain tensioning.

Figure 2:
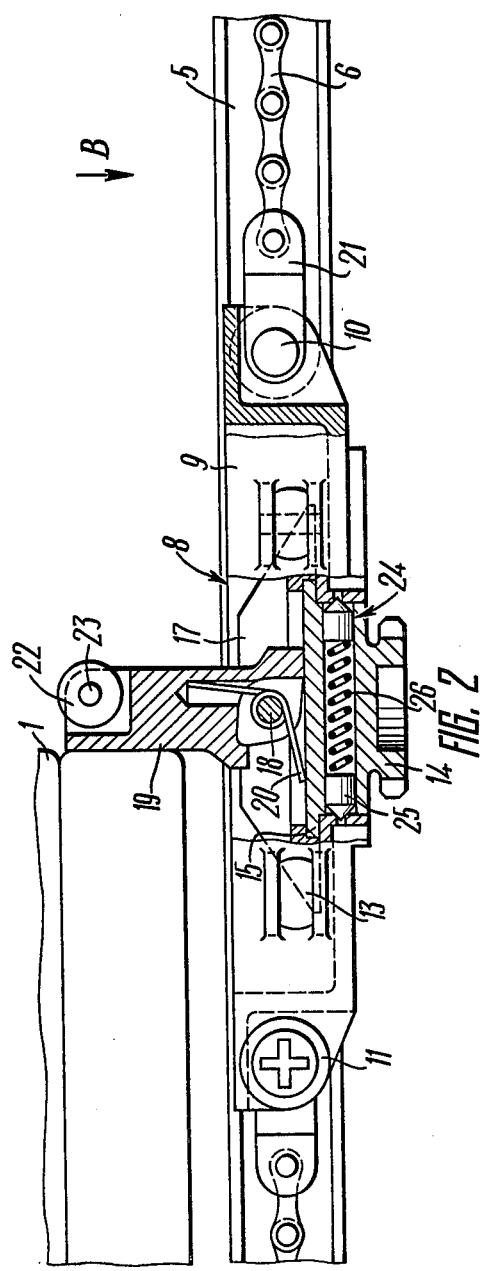
FIG. 2 is a sectional view taken along section the line II—II in FIG. 1 (turned at 90°)

Mounted within the guide members 5 and connected to the flexible traction member is a carriage 8. The carriage 8 has a cast body 9 with four vertical rollers 11 mounted on axles 10 and four horizontal rollers 13 mounted on axles 12 to the side walls of the body (FIGS. 2,3). A rotatable base 14 made in the form of a cylindrical bushing having an end collar 15 is journalled in a circular seat centrally of the body 9 of the carriage 8. Two lugs 16 (FIG. 3) are made in the end face of the bushing at the collar 15. The rotatable base 14 is mounted in the seat in such a manner that the collar 15 is in the top portion of the rotatable base 14 to hold the latter in the seat. A shaped latch 17 rigidly fixed to the body 9 of the carriage 8 holds the rotatable base 14 at the collar 15 against vertical dispacements.

A horizontally extending axle 18 is inserted in the lugs 16 of the rotatable base 14, carrying a spring-loaded lever 19 (FIGS. 2, 4) provided with a return spring 20.

The return spring 20 is essentially a torsion spring which is mounted on the same axle 18 with the lever 19 to bias the lever 19 to a vertical position due to the fact that one end of the return spring 20 bears against the rotatable base 14, whereas the other end of the spring is held against the lever 19.

In the lower portion of the lever 19, one side of the lever is supported by the rotatable base 14, while the other side of the lever 19 is rounded so that the lever 19 can pivot about the horizontal axle 18.

Lugs 21 are articulated to the end faces of the body 9 of the carriage 8 which are aligned with the axis of the carriage 8 (FIGS. 2,3). The carriage 8 is moved by means of the endless flexible traction member 6 (such as a chain or rope) which is secured to the carriage 8 at the lugs 21. The traction member 6 is tensioned by means of the chain tensioning mechanism 7 (FIG. 1). The carriage 8 travels along the cargo compartment within the guide members 5 incorporated in the floor 2 axially of the compartment.

Fixed to the distal end of the lever 19 is a roller 22 (FIGS. 2, 4) whose axle 23 is at right angle to the longitudinal axis of the carriage 8. The roller 22 enables the lever 19 to pass beneath the bottom of the container 1 without damaging when the container and lever contact or abut.

A locking member 24 (FIG. 5) is accommodated in the body of the rotatable base 14, this locking member consisting of two stops 25 and a spring 26 mounted therebetween. The stops 25 are made as cylindrical bodies with tapered tips facing the outer surface of the rotatable base 14. When the rotatable base 14 is in the working position the tapered tips of the stops 25 are received in holes provided in the side surface of the seat in the body 9 of the carriage 8.

The locking member 24 is adapted for holding the lever 19 in the working positions against rotation about its axis. When a force in a circumferential direction is applied to the gear 14 the stops are moved out of the holes and compress the spring 26 which allows rotation of the gear 14.

During displacement of the traction member 6 (FIG. 3) the rollers 11 and 13 of the carriage 8 travel over the guide members 5, and the lever 19 abuts with one side thereof against the rotatable base 14 and with the other side against the pallet of the container 1 to transfer the container 1 along the cargo compartment.

During transportation of the container 1 (FIG. 1), upon loading it into the cargo compartment, the carriage 8 is in a position A in which the lever 19 bears against the container 1 to displace it inside the cargo compartment.

During unloading of the container 1 from the cargo compartment, the carriage 8 is in a position D in which the lever 19 bears against the container 1 to displace it towards an unloading hatch 27.

The movement of the container 1 is reversed by turning the lever 19 and the rotatable base 14 through 180°. The locking member 24 (FIG. 5) holds the lever 19 in the working positions against accidental rotation about its axis.

The reference is now made in greater details to the reversal of transportation of the container 1.

Assuming the carriage 8 is in the position A after loading the containers 1 (FIG. 1), the carriage 8 is to be shifted to the position D for unloading of the containers 1.

For that purpose it is necessary:

(a) to rotate the lever 19 and the rotatable base 14 through 180°;

(b) energize the drive motor so that the carriage can be moved inside the cargo compartment. The lever 19 (FIG. 6) abutting against the bottom of the container 1 is pivoted about the horizontal axle 18 thus compressing the spring 20. The roller 22 rolls under the bottom of the container 1. After the roller 22 is released from the bottom of the container 1, the spring 20 returns the lever 19 back to the vertical position, whereby the carriage 8 occupies the position D (FIG. 1);

(c) deenergize the drive motor and reenergize again to make the carriage 8 move towards the unloading hatch 27;

(d) the lever 19 (FIG. 4) now bears against the rotatable base 14 to transfer the container 1 (FIG. 1) towards the unloading hatch 27.

Now, to transport the container 1 in the opposite direction, the lever 19 should again be rotated, together with the rotatable base 14, through 180°, and the above-described operations are repeated.

As follows from the description of operation of the arrangement for transportation of containers 1, the carriage 8 effects loading and unloading of each container 1 within the cargo compartment. This enables the employment of a comparatively low-input electric motor, while providing for convenient and simple operation.

What is claimed is:

1. Apparatus for transporting containers along a path comprising, a track for supporting individual containers thereon to be transported on the track, a driven endless traction member travelling beneath a level at which said containers are supported on said track and along the path of said track, a travelling carriage connected to said traction member for travelling therewith, a pivoted lever on said carriage movable to an upstanding position, means continuously biasing the lever to an upstanding position, said lever extending upwardly above said level when in an upstanding position, pivot means mounting the lever pivotally for movement to said upstanding position and to an inclined position in which said lever is disposed beneath said level, means for rendering the pivot means effective to render the lever pivotal to said inclined position when encountering a container during travel in said upstanding position when travelling in a given direction and resisting pivoting from said upstanding position when travelling in an opposite direction, and means to select when said lever will incline from said upstanding position when travelling in opposite directions when travelling in an upstanding position and a container is encountered, whereby the carriage will semiautomatically move containers in a given direction of travel of the carriage for loading and will move them in an opposite direction for unloading.

2. Apparatus for transporting containers along a path according to claim 11, in which said lever has a roller on a free end thereof.

3. Apparatus for transporting containers along a path according to claim 1 in which said last-mentioned means comprises lock means for alternately locking the lever in an upstanding position for travel in one direction of the carriage and render it deflectable to an inclined position when travel is an opposite direction, and the lock means including means to reverse the locked condition so that the lever remains upstanding when travelling in said opposite direction and is inclinable when travelling in said one direction.

4. Apparatus for transporting containers along a path according to claim 3, in which said track, carriage, traction member, lever and lock means are dimensioned to be mounted in an aircraft storage space.

* * * * *